(12) United States Patent
Mao

(10) Patent No.: US 6,191,564 B1
(45) Date of Patent: Feb. 20, 2001

(54) POWER FACTOR CORRECTING ELECTRICAL CONVERTER APPARATUS

(75) Inventor: Hengchun Mao, Plano, TX (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/449,047

(22) Filed: Nov. 24, 1999

(51) Int. Cl.[7] .............................. G05F 1/10; H02M 3/335

(52) U.S. Cl. ............................ 323/222; 363/21; 363/126

(58) Field of Search .................................. 323/222, 282, 323/284, 207; 363/48, 46, 124, 21, 126, 89

(56) References Cited

U.S. PATENT DOCUMENTS 5,777,866  7/1998  Jacobs et al. ...................... 363/126

*Primary Examiner*—Peter S. Wong
*Assistant Examiner*—Rajnikant B. Patel
(74) *Attorney, Agent, or Firm*—Donald D. Mondul

(57) ABSTRACT

A power factor correcting eletrical converter apparatus receives an alternating electrical input signal from a power source. The apparatus preferably includes an input tracking circuit connected with the power source for tracking the input signal and providing the input signal at an input tracking node. The converter apparatus includes a rectifying circuit connected with the power source for receiving the input signal and generating a rectified input signal, and a filtering circuit connected with the rectifying circuit to filter and smooth the rectified input signal. An input sensing circuit is connected with the input tracking circuit for receiving the input signal and generating an input-indicating signal at an input-sensing node. An output circuit is connected with the filtering circuit for delivering the rectified boost signal to a load. The output circuit senses an electrical parameter associated with the load to produce an output-indicating signal at an output-sensing node. A feedback circuit is connected with the input-sensing node and with the output-sensing node for receiving the input-indicating signal and the output-indicating signal and generating a gating signal. The output circuit responds to the gating signal to switchingly control connection with the load. The input sensing circuit or the feedback circuit may be configured to impose a delay which causes the input-indicating signal to be out of phase with the input signal. The phase shift reduces input current distortion and increases input power factor.

11 Claims, 10 Drawing Sheets

POWER FACTOR CORRECTING ELECTRICAL CONVERTER APPARATUS

BACKGROUND OF THE INVENTION

The present invention is directed to power factor correcting electrical converter apparatuses. Power factor correcting electrical converter apparatuses are known, as discussed in U.S. Pat. No. 5,777,866 to Jacobs, et al, for "Power Factor Control for Switched Mode Rectifiers with Improved Representing of Currents in EMI Capacitive Elements"; which is assigned to the assignee of the present application (hereinafter referred to as "the '866 Patent").

A power factor correcting electrical converter apparatus receives an alternating electrical input from a power source. The apparatus includes an input electromagnetic interference (EMI) filter connected with the power source. A rectifying circuit is connected with the EMI filter for receiving the input and generating a rectified voltage. To reduce the cost of the EMI filter, a capacitor is usually placed across the rectified voltage at the rectifying circuit. However, such a capacitor introduces more input current distortion because it prevents current flowing into the rectifier circuit (usually implemented as a diode bridge) whenever the voltage across the capacitor is greater than the value of the input voltage. A switching mode converter, usually a boost type, is connected between the rectifying circuit and an output to provide a regulated power to the output.

In order to draw a low-distortion input current, the '866 Patent teaches constructing such a power factor control converter using a capacitor sense arrangement to provide a feed-forward signal to a control loop. In particular, the '866 Patent teaches using a sense capacitor to provide a current to a current amplifier driving a pulse width modulator to control a power switch connecting a load to the converter apparatus.

The feed-forward arrangement taught by the '866 Patent is intended to reduce current distortion around zero-crossing of the input current signal. Current distortion is reduced by the enhanced converter of the '866 Patent. However, in that prior art converter apparatus extra protection circuitry is required because the apparatus is not controllable at very light loads. Further improvement of the apparatus' performance is desirable.

SUMMARY OF THE INVENTION

A power factor correcting electrical converter apparatus receives an alternating electrical input from a power source. The apparatus preferably includes an input tracking circuit connected with the power source for tracking the input and providing an input signal at an input tracking node. The converter apparatus includes a rectifying circuit connected with the power source for receiving the input and generating a rectified input, and a filtering circuit connected with the rectifying circuit to filter and smooth the rectified input voltage. This filtering circuit is usually a filtering capacitor connected across the output of the rectifying circuit. An input sensing circuit is connected with the input tracking circuit for receiving the input signal and generating an input-indicating signal at an input-sensing node. An output circuit is connected with the filtering circuit for delivering a regulated power to a load. The output circuit senses an electrical parameter associated with the load to produce an output-indicating signal at an output-sensing node. A feedback circuit is connected with the input-sensing node and with the output-sensing node for receiving the input-indicating signal and the output-indicating signal and generating a gating signal. The output circuit responds to the gating signal to switchingly control connection with the load. The input sensing circuit is configured to impose a delay which causes the input-indicating signal to be out of phase with the input signal. The delay may be introduced in the feedback circuit, in whole or in part, if desired. The phase shift reduces input current distortion and increases input power factor.

For high-performance applications, measures must be taken to reduce the input current distortion around the zero-crossing of the alternating input voltage caused by the filtering capacitor. In previous, prior art converters of the type of the present invention, the feed-forward circuitry pushed more power than was needed or desired at or near zero-crossing points of the input voltage.

By phase shifting, or delaying, the reference current employed to determine gating signals to the output circuit of the converter, the discharging current across the filtering capacitor is increased in the vicinity of the zero-crossing point of the input voltage. The result is a lower residual voltage across the filtering capacitor, which in turn reduces the diode-bridge blocking time caused by the rectifying circuit when the input voltage is less than the residual voltage across the filtering capacitor. A significant consequence of such reduced diode-bridge blocking time is a much-reduced distortion of input current in the vicinity of the zero-crossing point of the input signal.

The apparatus of the present invention may be advantageously employed with any type of converter device in a power factor correcting application, including, but not limited to boost, buck, flyback, forward, SEPIC (Single-Ended Primary Inductor Converter) and Cuk converters.

It is therefore, an object of the present invention to provide a power factor correcting electrical converter apparatus which reduces distortion of input current in the vicinity of the zero-crossing point of the input signal.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
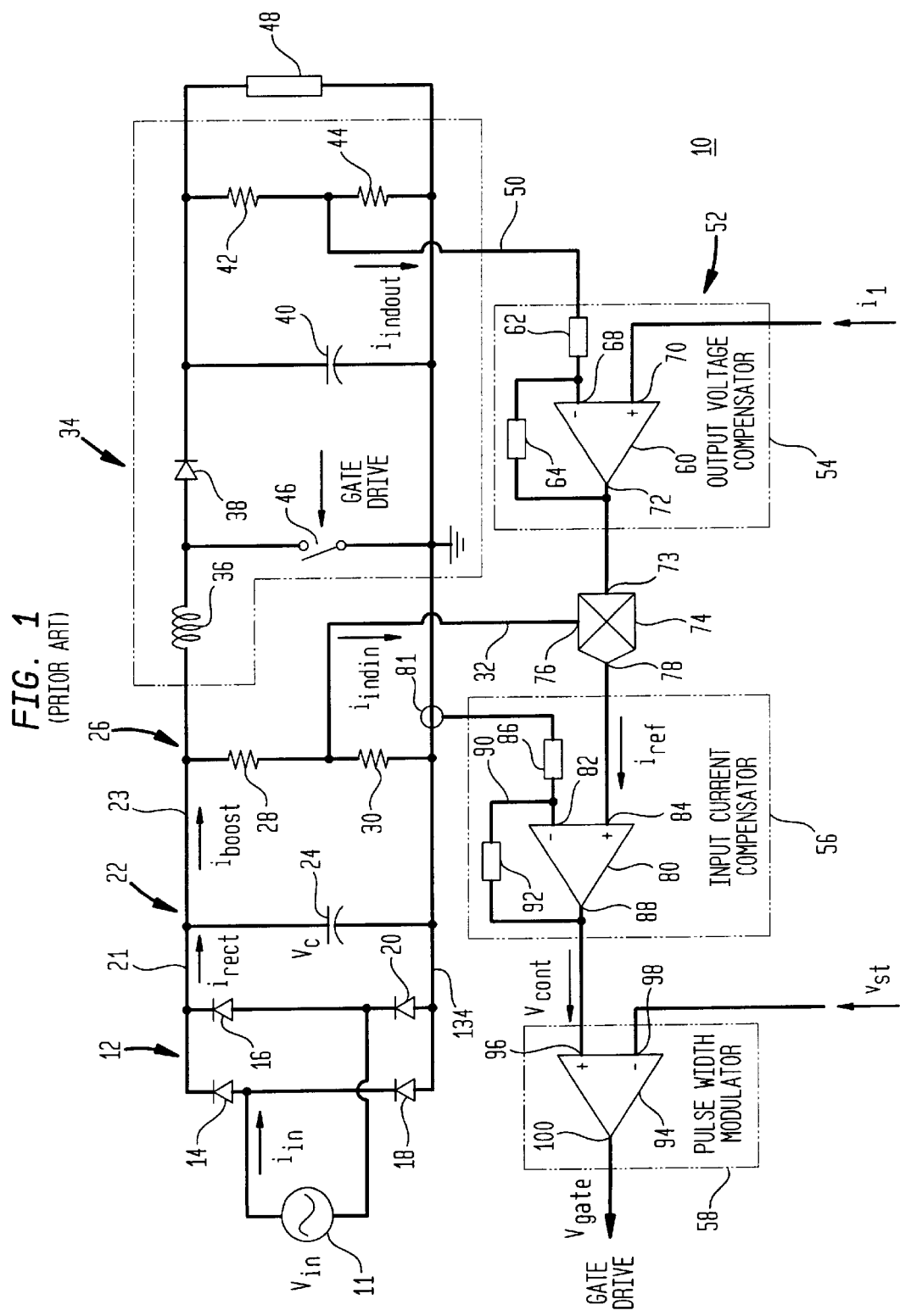
FIG. 1 is an electrical schematic diagram of a conventional prior art power factor correcting switched electrical converter.

FIG. 1 is an electrical schematic diagram of a conventional prior art power factor correcting switched electrical converter. In FIG. 1, an electrical converter 10 receives an alternating input having an alternating voltage $v_{in}$ with an alternating current $i_{in}$ from an alternating power source 11. A high-frequency electromagnetic interference (EMI) filter is usually included in the power source 11, but is not shown in FIG. 1. Converter 10 includes a rectifying circuit, or device, 12. Rectifying circuit 12 includes diodes 14, 16, 18, 20, preferably connected to effect full-bridge rectifying of the alternating input, as illustrated in FIG. 1. Rectifying circuit 12 produces a rectified input current $i_{rec}$ at a locus 21 of converter 10.

Electrical converter 10 further includes a filtering circuit, or device, 22. In the prior art converter 10 of FIG. 1, filtering circuit 22 comprises a capacitor 24 connected to filter a boost current $i_{boost}$ at a locus 23 which is produced by a boost converter 34 to get a smoother rectified input current $i_{rec}$ appearing at locus 21. An input voltage sensing circuit, or device, 26 comprises resistors 28, 30 arranged intermediate locus 23 and a line 134 (completing a circuit from a load 48 with rectifying circuit 12) in a voltage divider circuit configuration, as illustrated in FIG. 1. Input voltage sensing circuit 26 produces an input-indicating signal $i_{indin}$ at an input-sensing node 32. Input-indicating signal $i_{indin}$ is a representation of a voltage $v_c$ across capacitor 24.

A boost converter 34 includes an inductor 36; a diode 38; a capacitor 40; resistors 42, 44, connected in a voltage divider circuit configuration intermediate diode 38 and line 134; and a switch 46. Boost converter 34 controls boost current $i_{boost}$ and output voltage across load 48; boost converter 34 delivers power to load 48. Resistors 42, 44 sense output voltage across load 48 and present an output-indicating signal $i_{indout}$ at an output-indicating node 50.

A feedback circuit, or device, 52 includes an output voltage compensator circuit 54, an input current compensator circuit 56, and a pulse width modulator circuit 58. Output voltage compensator circuit 54 comprises an operational amplifier 60 having an input impedance 62 and a feedback impedance 64 connected within a feedback loop 66. Output voltage compensator circuit 54 has an inverting input 68, a noninverting input 70, and an output 72. Input impedance 62 is connected with inverting input 68. Feedback loop 66, including feedback impedance 64, connects output 72 with inverting input 68. Inverting input 68 is connected with output-indicating node 50 via input impedance 62, so output-indicating signal $i_{indout}$ is applied to inverting input 68 of output voltage compensator circuit 54. A signal $i_1$ is applied to noninverting input 70 of output voltage compensator circuit 54. The output signal from output voltage compensator circuit 54 produced at output 72 is provided at a first input 73 to a multiplier 74.

Multiplier 74 is connected with input-sensing node 32 and receives input-indicating signal $i_{indin}$ at a second input 76. An output 78 of multiplier 74 presents a reference signal $i_{ref}$ to input current compensator circuit 56. Reference signal $i_{ref}$ is a scaled version of input-indicating signal $i_{indin}$.

Input current compensator circuit 56 comprises an operational amplifier 80 having an inverting input 82, a noninverting input 84, an input impedance 86, an output 88, and a feedback loop 90 connecting output 88 with inverting input 82. Feedback loop 90 includes a feedback impedance 92. Reference signal $i_{ref}$ is applied from output 78 of multiplier 74 to noninverting input 84 of operational amplifier 80. In alternate embodiments of the apparatus (not illustrated herein) reference signal $i_{ref}$ may be connected via an impedance to inverting input 82 of operational amplifier 80. In the embodiment of converter apparatus 10 illustrated in FIG. 1, inverting input 82 of operational amplifier 80 receives, via input impedance 86, a current signal of rectifying circuit 12 from a current sensor 81 sensing current in line 134. Output 88 of operational amplifier 80 presents a control signal $v_{cont}$ to pulse width modulator circuit 58.

Pulse width modulator circuit 58 comprises a comparator 94 with a noninverting input 96, an inverting input 98, and an output 100. Control signal $v_{cont}$ from input current compensator circuit 56 is received at noninverting input 96. A sawtooth waveform $v_{st}$ is applied to inverting input 98, and a gating signal $v_{gate}$ is produced at output 100. In an alternate embodiment (not illustrated) pulse width modulator circuit 58 may be implemented as a leading edge modulator.

Gating signal $v_{gate}$ is applied to switch 46 (as indicated by the commonly labeled "GATE DRIVE" actuator arrows in FIG. 1), and thereby controls application of boost current $i_{boost}$ to load 48. That is, when gating signal $v_{gate}$ operates to open switch 46, boost converter 34 is appropriately connected within converter 10 to deliver boost current $i_{boost}$ to load 48. When gating signal $v_{gate}$ operates to close switch 46, boost converter 34 reconfigured to charge boost inductor 36 and not to deliver boost current $i_{boost}$ to load 48.

FIG. 2 is a graphic representation of several parameters associated with the converter illustrated in FIG. 1. FIG. 2(a) is a graphic representation of the absolute value of the alternating input voltage signal $v_{in}$ received from alternating power source 11 (FIG. 1). FIG. 2(a) plots absolute value of alternating input voltage signal $|v_{in}|$ over time, t. FIG. 2(b) is a graphic representation of the value of reference signal $i_{ref}$ (applied to noninverting input 84 of input current compensator circuit 56 in FIG. 1). FIG. 2(b) plots reference signal $i_{ref}$ over time, t. FIG. 2(c) is a graphic representation of the value of voltage $v_c$ across capacitor 24 (FIG. 1). FIG. 2(c) plots voltage $v_c$ over time, t. FIG. 2(d) is a graphic representation of the absolute value of alternating input current signal $i_{in}$ received from alternating power source 11 (FIG. 1). FIG. 2(d) plots absolute value of alternating input current signal $|i_{in}|$ over time, t.

Figure 2A:
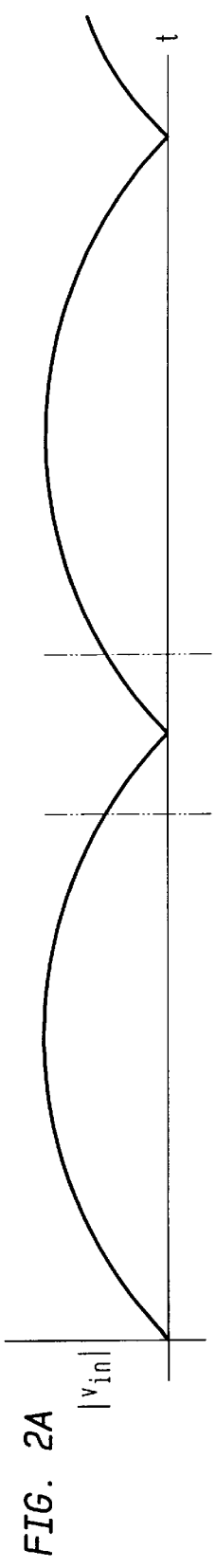
FIG. 2 is a graphic representation of several parameters associated with the converter illustrated in FIG. 1.
Figure 2B:
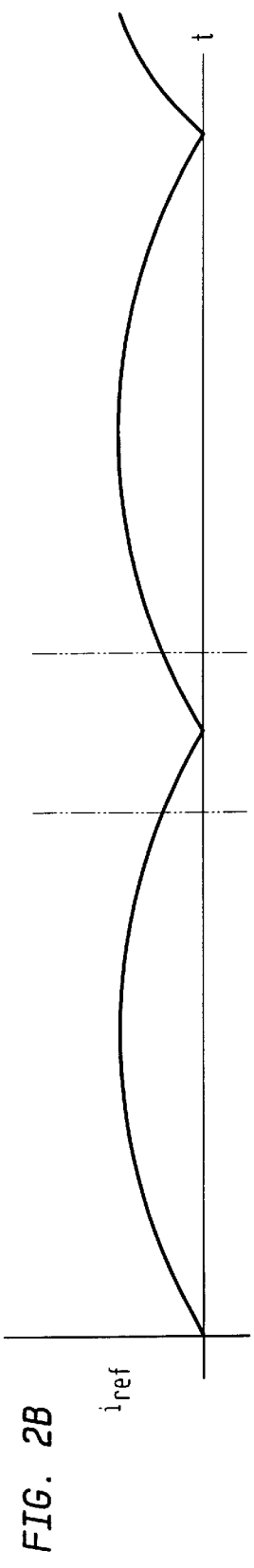
Figure 2C:
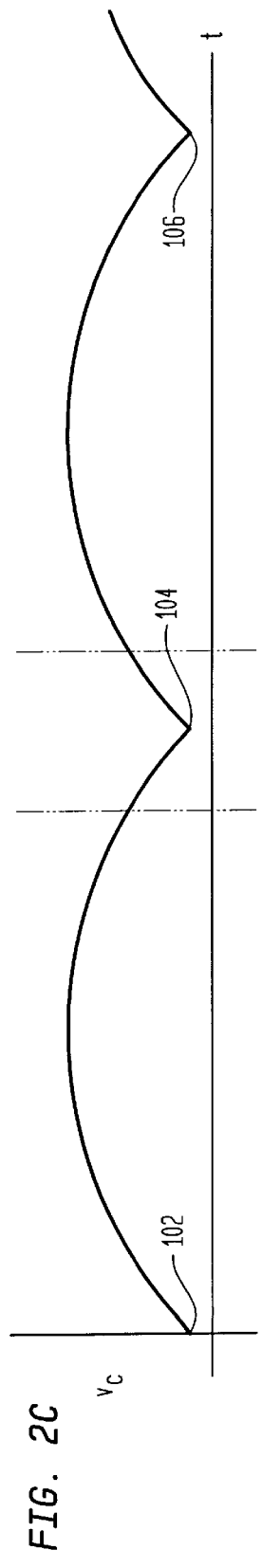
Figure 2D:
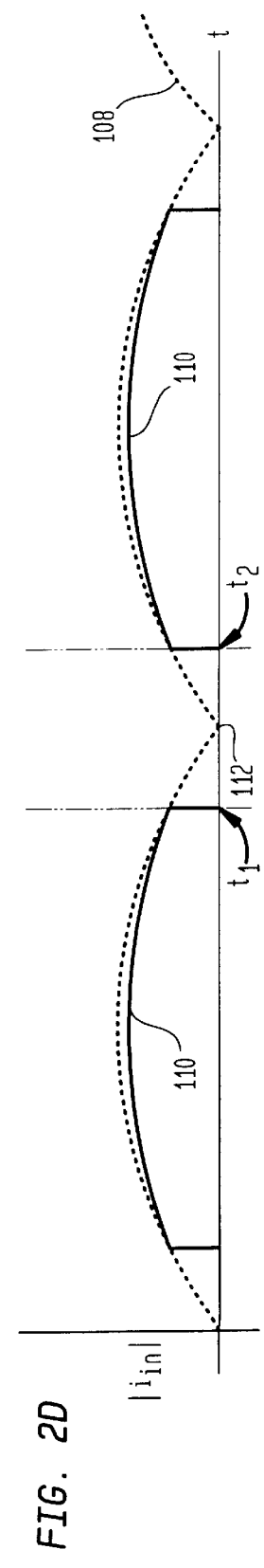

In FIG. 2(a), absolute value of alternating input voltage signal $|v_{in}|$ makes repeated positive excursions over time. In FIG. 2(b), it may be observed that reference signal $i_{ref}$ is in phase with signal $|v_{in}|$. Referring to FIG. 2(c), it may be observed that voltage $v_c$ is generally in phase with reference signal $i_{ref}$ and is in phase with signal $|v_{in}|$. However, voltage $v_c$ never returns to zero, but reaches its minimum value at a value above zero at the end of each cycle, as at points 102, 104, 106. This failure of voltage $v_c$ to return to zero occurs because there is residual, or stored voltage $v_c$ in capacitor 24 (FIG. 1) which is not fully discharged. Thus, there is always some amount of voltage $v_c$ present in capacitor 24 and voltage $v_c$ does not reach zero. This Share of voltage $v_c$ to reach zero has important consequences which become evident upon inspecting FIG. 2(d). In FIG. 2(d), an unaffected alternating input current signal $i_{in}$ (i.e., without the effects of voltage $v_c$ in capacitor 24) is represented by dotted-line curve 108. It may be observed that this unaffected signal is in phase with signal $|v_{in}|$. However, the actual behavior of alternating input current signal $i_{in}$ is represented by solid line 110 in FIG. 2(d). Whenever the absolute value of alternating input signal $|v_{in}|$ is less than the value of voltage $v_c$ across capacitor 24, diodes 14, 16, 18, 20 in rectifying circuit 12 (FIG. 1) block alternating input current signal $i_{in}$. Thus, the true plot of alternating input current signal $i_{in}$ in the presence of voltage $v_c$ across capacitor 24 is represented by curve 110 in FIG. 2(d). Referring to curve 110, and in particular at the end of the first period and the beginning of the second period of curve 110, in the vicinity of point 112, it may be observed that there is a period of time, from time $t_1$ to time $t_2$, during which alternating input current signal $i_{in}$ is blocked. The interval $t_1$–$t_2$ is the period during which signal $|v_{in}|$ is less than voltage $v_c$, and rectifying circuit 12 (FIG. 1) blocks alternating input current signal $i_{in}$. The result of this aberration of alternating input current signal $i_{in}$ during interval $t_1$–$t_2$ is a source of current distortion in the vicinity of zero-crossing of the alternating input voltage received from alternating power source 11 (FIG. 1).

Figure 3:
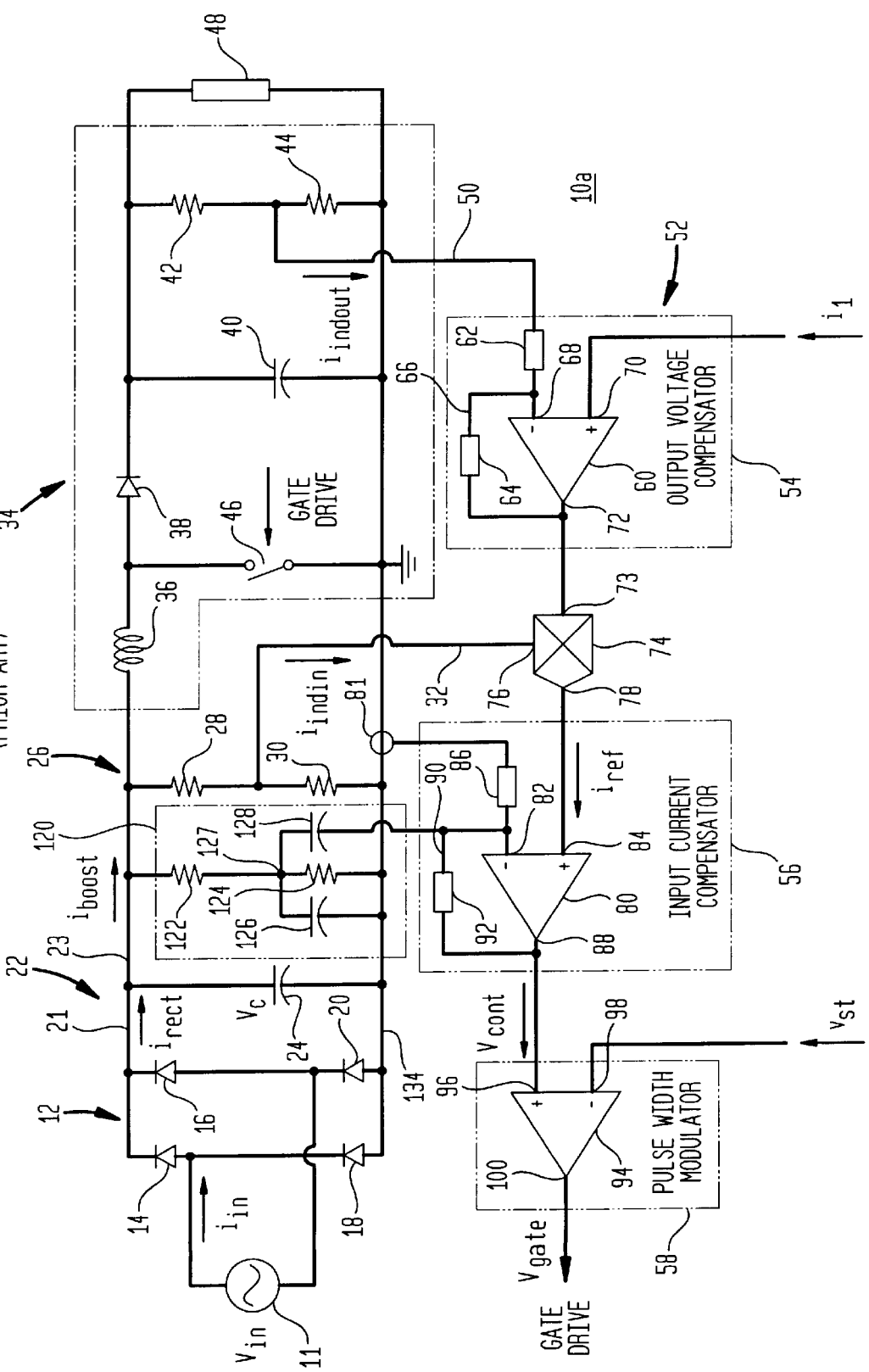
FIG. 3 is an electrical schematic diagram of an improved prior art power factor correcting switched electrical converter.

FIG. 3 is an electrical schematic diagram of an improved prior art power factor correcting switched electrical converter. In FIG. 3, an electrical converter 10a is substantially the same construction in many respects as converter 10, illustrated in FIG. 1. Therefore, in the interest of avoiding prolixity, a detailed construction of elements of converter 10a which are common with converter 10 will not be recited here.

Electrical converter 10a includes an input voltage feed-forward circuit 120. Input voltage feed-forward circuit 120 includes resistors 122, 124 connected in a voltage divider configuration intermediate locus 23 and line 134, as illustrated in FIG. 3. Input voltage feed-forward circuit 120 further includes capacitors 126, 128. Capacitor 128 is connected with feedback loop 90 of input current compensator circuit 56 and with a juncture 127 intermediate resistors 122, 124. Capacitor 126 is connected with line 134 and with juncture 127.

Input voltage feed-forward circuit 120 forces the signal level applied at inverting input 86 of input current compensator circuit 56 lower as signal $|v_{in}|$ goes low, such as just before interval $t_1$–$t_2$ in FIG. 2. Stated another way, as alternating input voltage signal $v_{in}$ approaches zero-crossing, the signal applied to inverting input 86 of input current compensator circuit 56 is forced lower. The lower the signal that is applied to inverting input 86, the higher the value of control signal $v_{cont}$ at output 88 of input current compensator circuit 56. The consequence of such a higher value of $v_{cont}$ is that pulse width modulator 58 will present gating signal $v_{gate}$ at output 100 for a longer duration than would be the case if inverting input 86 were not driven low. When gating signal $v_{gate}$ is present at output 100 for a longer period, then switch 46 is closed for a longer duration, and the current in inductor 36 in the vicinity of zero-crossing of alternating input signal $v_{in}$ is increased. As a result, the duration in which voltage $v_c$ is greater than $|v_{in}|$ is reduced, thus reducing current distortion in the vicinity of zero-crossing by alternating input voltage signal $v_{in}$. However, it has been found that the signal feed-forward construction of FIG. 3 may push more power than is needed, especially in very light load conditions. A problem caused by such excess power is a possible output overvoltage condition. As a consequence, additional circuitry (not shown or discussed) must often be employed in such devices in order to provide requisite protection for feedback circuit 52. Such additional circuitry is an undesirable added expense in employing the solution illustrated in FIG. 3.

Figure 4:
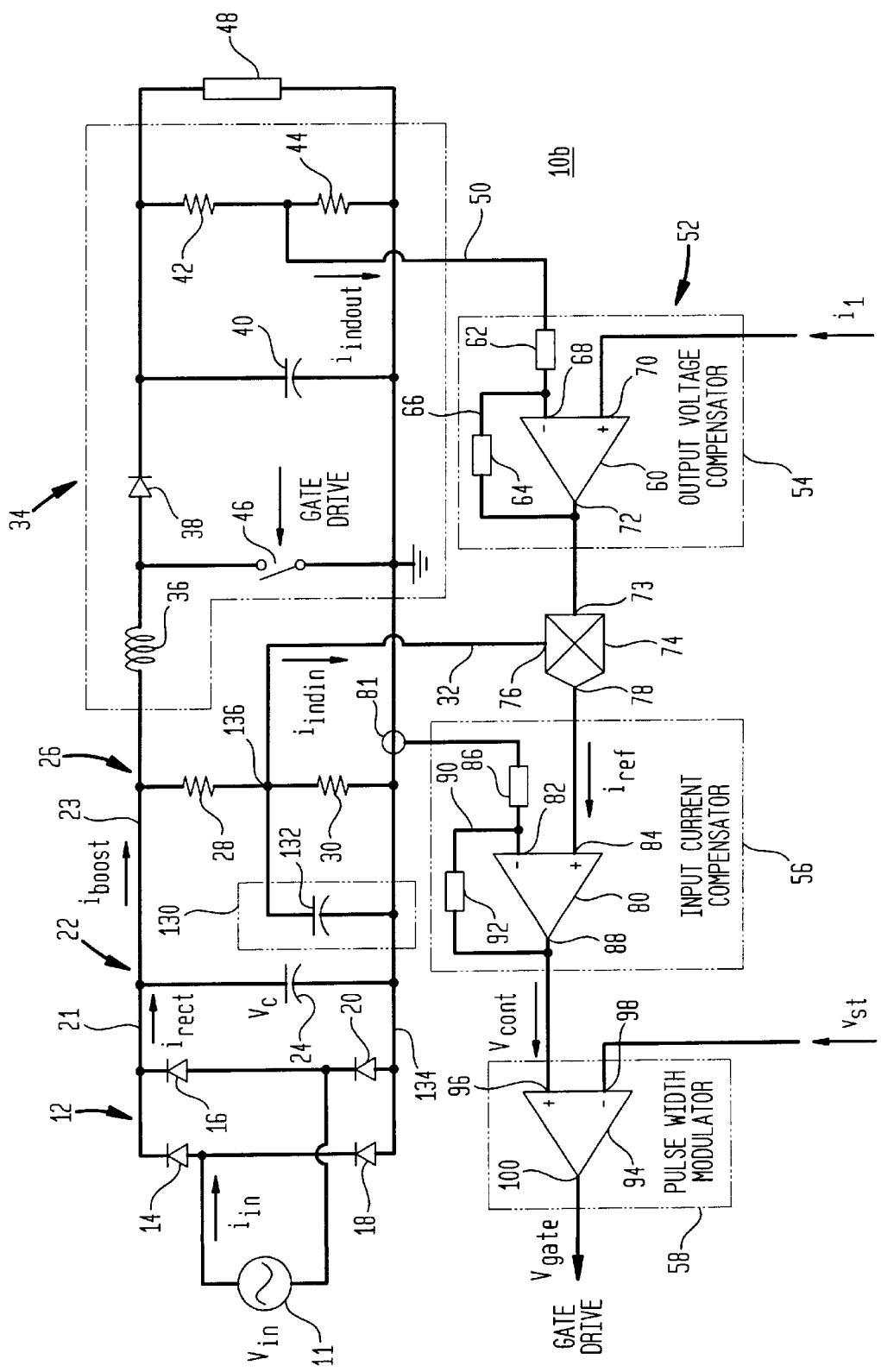
FIG. 4 is an electrical schematic diagram of one embodiment of the power factor correcting switched electrical converter of the present invention.

FIG. 4 is an electrical schematic diagram of one embodiment of the power actor correcting switched electrical converter of the present invention. In FIG. 4, an electrical converter 10b is substantially the same construction as converter 10, illustrated in FIG. 1. Therefore, in the interest of avoiding prolixity, a detailed construction of elements of converter 10b which are common with converter 10 will not be recited here.

A significant improvement included in converter 10b of FIG. 4 is an input signal delay circuit, or device, 130. In its preferred embodiment, input signal delay circuit 130 comprises a capacitor 132 connecting line 134 and a junction 136 intermediate resistors 28, 30 of input voltage sensing circuit 26. Input signal delay circuit 130 cooperates with resistor 30 to impose a resistive-capacitive (RC) time, or phase, delay the rectified input voltage. The RC delay is manifested in input-indicating signal $i_{indin}$. The delayed input-indicating signal $i_{indin}$ is applied to multiplier 74, thus contributing a delay factor to reference signal $i_{ref}$ which is the input signal to noninverting input 84 of input current compensator circuit 56. The delay imposed upon input-indicating signal $i_{indin}$, and consequently on reference signal $i_{ref}$, increases the discharging current to capacitor 24 near zero-crossing of alternating input voltage signal $v_{in}$. As a consequence of such an increased discharging current, there is a lower voltage $v_c$ across capacitor 24, which results in a reduced diode-bridge blocking time in the interval including zero-crossing of alternating input voltage signal $v_{in}$. The significant consequence of such reduced diode-bridge blocking time is that there is less current distortion in the interval including zero-crossing of alternating input voltage signal $v_{in}$. Moreover, power provided to load 48 by improved converter 10b is controlled only by multiplier 74. Thus there is no overriding influence imposed by a derivative signal from boost current $i_{boost}$, as was the case in converter 10a, illustrated in FIG. 3. There is no uncontrollable voltage overshoot in converter 10b, illustrated in FIG. 4.

Figures 5A, 5B, 5C, 5D:
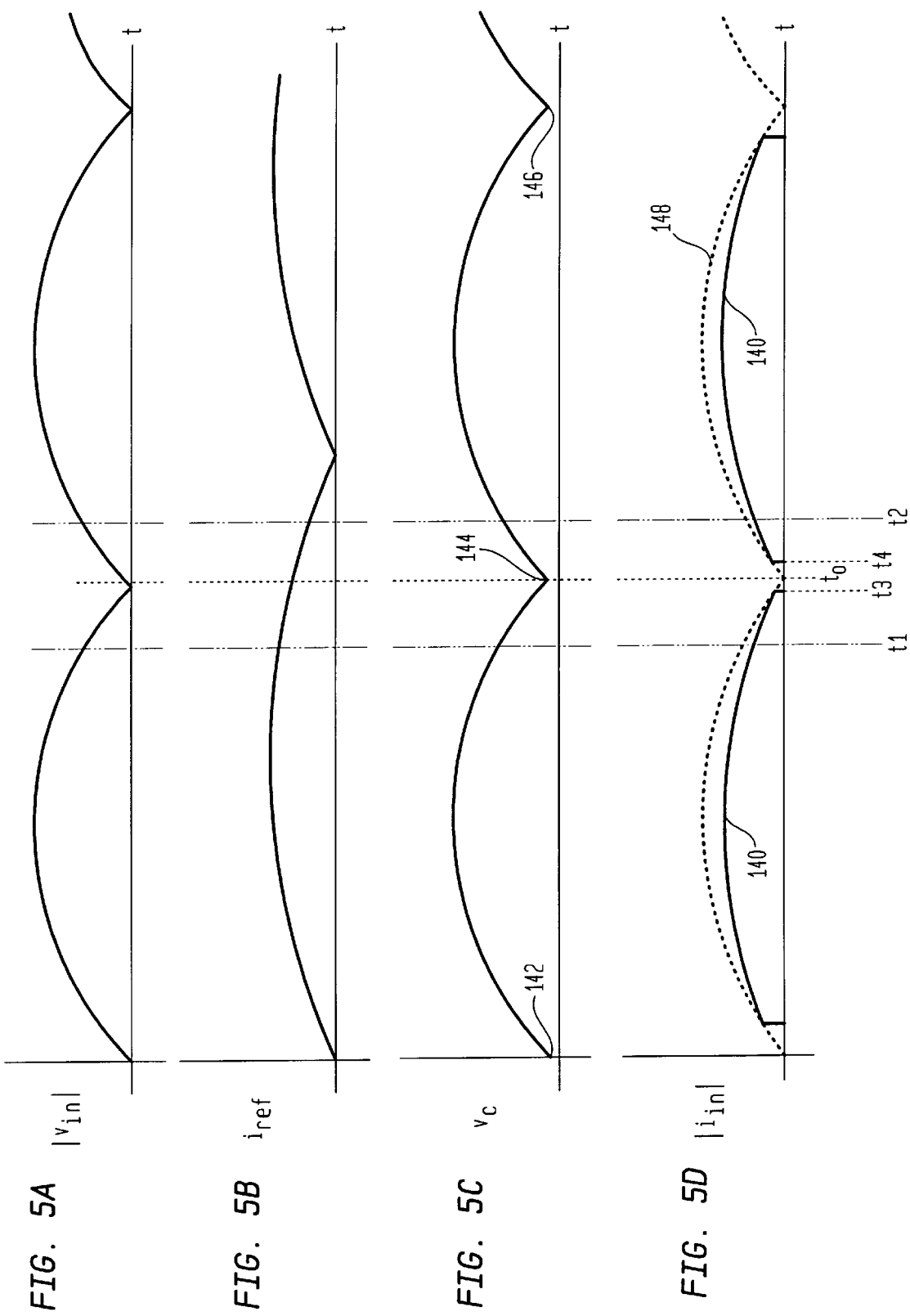
FIG. 5 is a graphic representation of several parameters associated with the converter illustrated in FIG. 4.

FIG. 5 is a graphic representation of several parameters associated with the converter illustrated in FIG. 4. FIG. 5(a) is a graphic representation of the absolute value of the alternating input voltage signal $|v_{in}|$ received from alternating power source 11 (FIG. 4). FIG. 5(a) plots absolute value of alternating input voltage signal $|V_{in}|$ over time, t. FIG. 5(b) is a graphic representation of the value of reference signal $i_{ref}$, which is the input to noniverting input 84 of input current compensator circuit 56 (FIG. 4). FIG. 5(b) plots reference signal $i_{ref}$ over time, t. FIG. 5(c) is a graphic representation of the value of voltage $v_c$ across capacitor 24 (FIG. 4). FIG. 5(c) plots voltage $v_c$ over time, t. FIG. 5(d) is a graphic representation of the absolute value of alternating input current signal $|i_{in}|$ received from alternating power source 11 (FIG. 4). FIG. 5(d) plots absolute value of alternating input current signal $|i_{in}|$ over time, t.

In FIG. 5(a), alternating input voltage signal $v_{in}$ makes repeated positive excursions over time. In FIG. 5(b), it may be observed that reference signal $i_{ref}$ is delayed, or phase-shifted, with respect to signal $|v_{in}|$. Referring to FIG. 5(c), it may be observed that voltage $v_c$ is in phase with signal $|v_{in}|$. However, voltage $v_c$ never returns to zero, but reaches its minimum value at a value above zero at the end of each cycle, as at points 142, 144, 146. This failure of voltage $v_c$ to return to zero occurs because there is residual, or stored voltage (i.e., $v_c$) in capacitor 24 (FIG. 4), which is not fully discharged. This failure of voltage $v_c$ to reach zero caused serious consequences, as discussed earlier in connection with FIG. 2. In FIG. 5(d), an unaffected alternating input current signal $i_{in}$ (i.e., without the effects of voltage $v_c$ in capacitor 24) is represented by dotted-line curve 148. It may be observed that this unaffected signal is in phase with signal $|v_{in}|$. Whenever the absolute value of alternating input voltage signal $|v_{in}|$ is less than the value of voltage $v_c$ across capacitor 24, then diodes 14, 16, 18, 20 in rectifying circuit 12 (FIG. 4) establish a diode-blocking effect to block alternating input current signal $i_{in}$. The true plot of alternating input current signal $i_{in}$ in the presence of voltage $v_c$ across capacitor 24 is represented by curve 140 in FIG. 5(d). Referring to curve 140, and in particular at the end of the first period and the beginning of the second period of curve 140, in the vicinity of time $t_0$, it may be observed that there is a period of time, an interval from time $t_3$ to time $t_4$ (a diode-blocking interval $t_3$–$t_4$) during which alternating input current signal $i_{in}$ is blocked. Diode-blocking interval $t_3$–$t_4$ is the period during which signal $|v_{in}|$ is less than voltage $v_c$, and rectifying circuit 12 (FIG. 4) blocks alternating input current signal $i_{in}$. This aberration of alternating input current signal in during diode-blocking interval $t_3$–$t_4$ causes current distortion in the vicinity of zero-crossing of alternating input voltage $v_c$ from alternating power source 11 (FIG. 4).

The present invention imposes a delay to cause reference signal $i_{ref}$ and alternating input voltage signal $|v_{in}|$ to be out of phase. In fact, at the time that signal $|v_{in}|$ is at its minimum value, i.e., at time $t_0$ in FIG. 5, reference signal $i_{ref}$ still has a positive value because of its phase-shifted delay. As a result of the delay-caused positive value of reference signal $i_{ref}$ at time $t_0$, there is a greater discharging current applied to capacitor 24 (FIG. 4) than if reference signal $i_{ref}$ were in-phase with alternating input voltage signal $v_{in}$ and had a value of zero at time $t_0$. A greater discharging current establishes a lower voltage $v_c$ across capacitor 24, as reflected in the curve of FIG. 5(c) at points 142, 144, 146. The minimum value of voltage $v_c$ across capacitor 24 at time $t_0$ is less than the value across capacitor 24 in prior art devices earlier described in connection with FIGS. 1 and 3. The lower value for voltage $v_c$ in converter 10b provides that diode-bridge blocking effects (caused by rectifying circuit 12 when capacitor 24 has a higher voltage $v_c$ than the absolute value of alternating input voltage $|v_{in}|$) occur later in time. As may be seen in FIG. 5(d), the delay in onset of a diode-blocking effect delays the blocking of alternating input current signal $i_{in}$, represented in FIG. 5(d) as absolute value of alternating input current signal $|i_{in}|$. The onset of blocking of signal $|i_{in}|$ in converters 10 and 10b (FIGS. 1 and 3, respectively) occurs at time $t_1$. In converter 10b (FIG. 4), the onset of diode blocking of signal $|i_{in}|$ does not occur until time $t_3$, later than time $t_1$. Similarly, the cessation of blocking of signal $|i_{in}|$ in converters 10 and 10b (FIGS. 1 and 3, respectively) occurs at time $t_2$. In converter 10b (FIG. 4), the cessation of diode blocking of signal $|i_{in}|$ occurs at time $t_4$, earlier than time $t_2$. Diode-blocking of alternating input current signal $i_{in}$, and consequently blocking of signal $|i_{in}|$, occurs when the value of signal $|v_{in}|$ is greater than the value of voltage $v_c$. That relationship occurs during the time interval $t_3$–$t_4$ in converter 10b (FIG. 4), a shorter interval than the duration of diode blocking (time interval $t_1$–$t_2$) experienced by converters 10, 10a (FIGS. 1 and 3). A consequence of the shortened diode blocking with converter 10b (FIG. 4) is a reduced distortion of alternating input current signal $i_{in}$ in the vicinity of zero-crossing by alternating input voltage signal $v_{in}$. The phase delay also introduces a lagging reactive current to input current signal $i_{in}$ which compensates the leading reactive current caused by filter capacitors, further increasing the input power factor.

Figure 6:
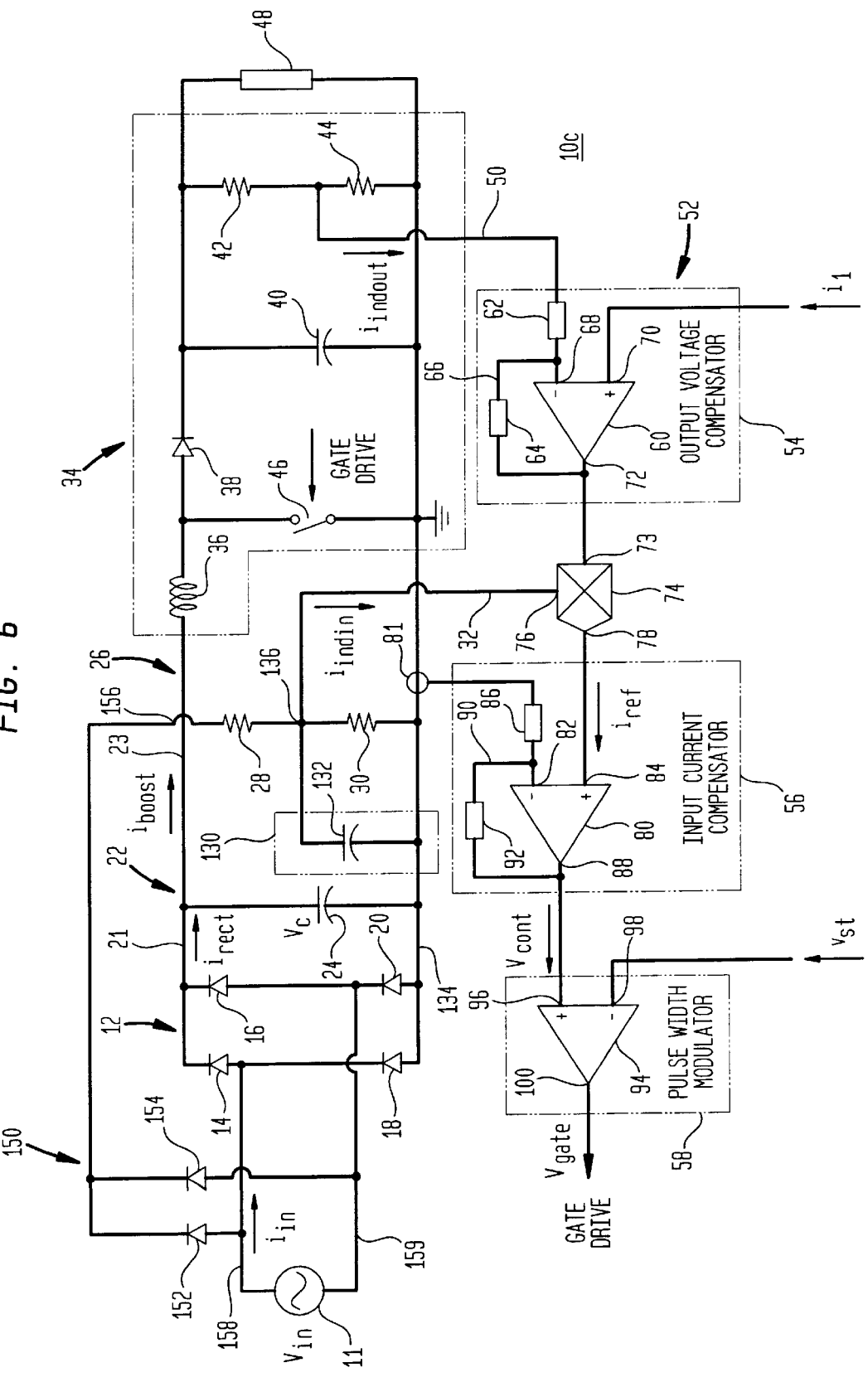
FIG. 6 is an electrical schematic diagram of the preferred embodiment of the power factor correcting switched electrical converter of the present invention.

FIG. 6 is an electrical schematic diagram of the preferred embodiment of the power factor correcting switched electrical converter of the present invention. In FIG. 6, an electrical converter 10c is substantially the same construction in many respects as converter 10b, illustrated in FIG. 4. Therefore, in the interest of avoiding prolixity, a detailed construction of elements of converter 10c which are common with converter 10b will not be recited here.

A significant improvement included in converter 10c of FIG. 6 is input tracking circuit 150. Input tracking circuit 150 is preferably comprised of diodes 152, 154. Each diode 152, 154 is connected to a respective side 158, 159 of alternating power source 11 in order that an accurate indication of alternating input voltage signal $v_{in}$ may be provided to input voltage sensing circuit 26 at juncture, or input sensing node, 136. In providing such a directly sensed alternating input voltage signal $v_{in}$ from alternating power source 11, any aberrations or inaccuracies which may be introduced by rectifying circuit 12 or by filtering circuit 22 are avoided, especially noise or distortion caused by switching actions. Using the construction of converter 10c incorporating input tracking circuit 150, a more accurate indication of alternating input voltage signal $v_{in}$ may be provided as the basis for input-indicating signal $i_{indin}$ than may be provided by converter 10b, illustrated in FIG. 5.

Figure 7:
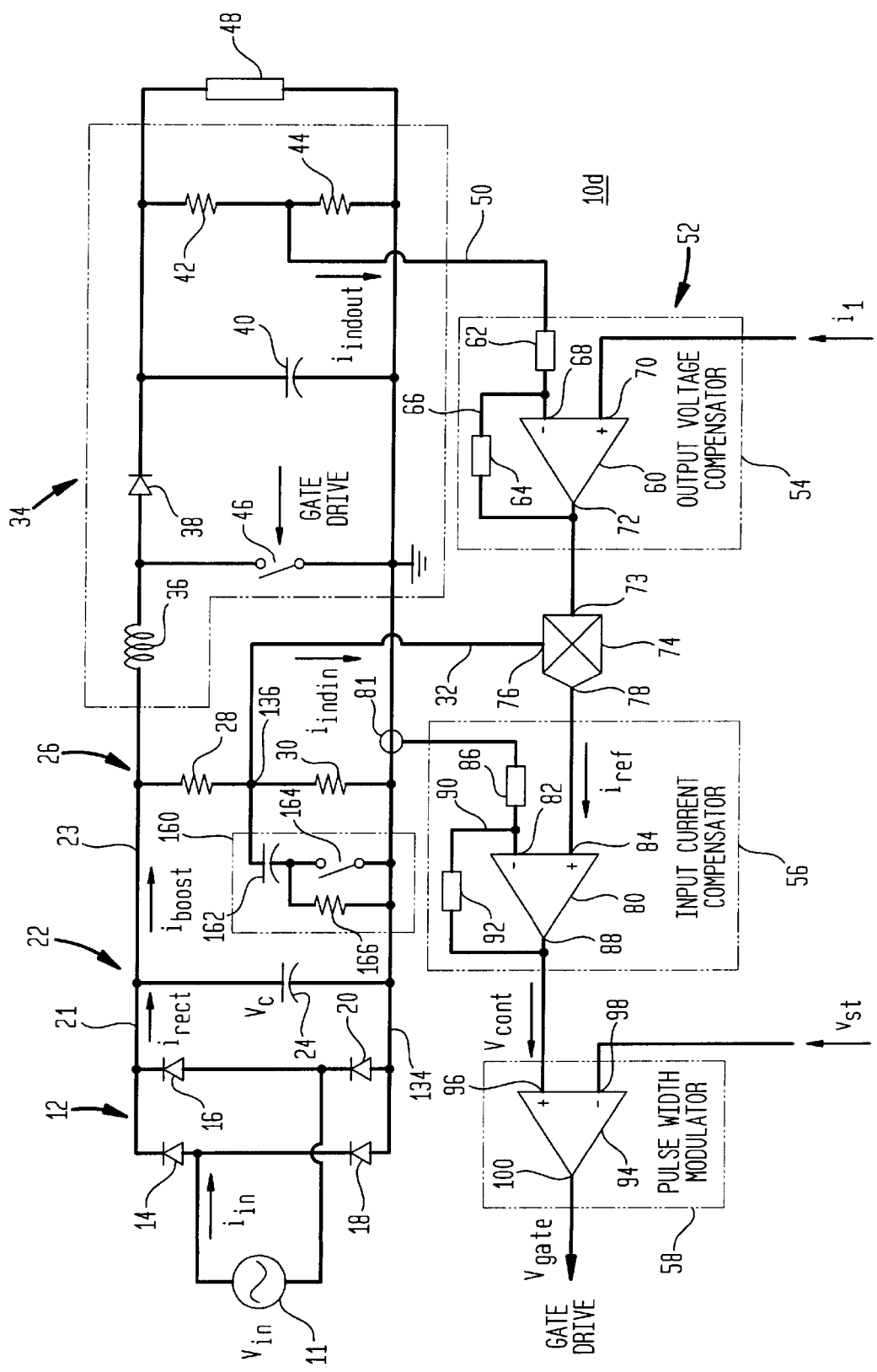
FIG. 7 is an electrical schematic diagram of a third embodiment of the power factor correcting switched electrical converter of the present invention.

FIG. 7 is an electrical schematic diagram of a third embodiment of the power factor correcting switched electrical converter of the present invention. In FIG. 7, an electrical converter 10d is substantially the same construction in many respects as converter 10b, illustrated in FIG. 4. Therefore, in the interest of avoiding prolixity, a detailed construction of elements of converter 10d which are common with converter 10b will not be recited here.

A significant improvement included in converter 10d of FIG. 7 is a switchable delay circuit 160. Switchable delay circuit 160 comprises a capacitor 162 connecting line 134 and a junction 136 intermediate resistors 28, 30 of input voltage sensing circuit 26. Switchable delay circuit 160 further comprises a switching device 164 in series with capacitor 162 intermediate capacitor 162 and line 134. Switchable delay circuit 160 may include a resistive element 166 connected in parallel with switching device 164, as will be discussed below.

Input signal delay circuit 160 cooperates with resistor 30 to impose a resistive-capacitive (RC) time delay upon boost current $i_{boost}$ when switching device 164 is closed and, as a consequence of closing switching device 164, capacitor 162 is connected in parallel with resistor 30. The RC time delay thus imposed is manifested in input-indicating signal $i_{indin}$, and the resulting effects are substantially the same as those benefits experienced with converter 10b (FIG. 4). The delayed input-indicating signal $i_{indin}$ is applied to multiplier 74, thus contributing a delay factor to reference signal $i_{ref}$, the input signal to noninverting input 84 of input current compensator circuit 56. The phase delay imposed upon input-indicating signal $i_{indin}$, and consequently on reference signal $i_{ref}$, increases the discharging current to capacitor 24 near zero-crossing of signal $|v_{in}|$. Such a higher discharging current results in a lower voltage $v_c$ across capacitor 24, which results in a reduced diode-bridge blocking time in the interval including zero-crossing of alternating input voltage signal $v_{in}$. The significant consequence of such a reduced diode-bridge blocking interval (time interval $t_3$–$t_4$ in FIG. 5)

is less current distortion in the vicinity of zero-crossing of alternating input voltage signal $v_{in}$. Moreover, power provided to load 48 is controlled only by multiplier 74. Thus there is no overriding influence imposed by a derivative signal from boost current $i_{boost}$, as was the case in converter 10a (FIG. 3).

With the embodiment of the present invention illustrated in FIG. 7, however, there is an added dimension of flexibility not available with the embodiment of the present invention illustrated in FIG. 4 (converter 10b). That is, when the amplitude, or root mean square (RMS) value, of alternating input voltage signal $v_{in}$ is low, one needs less phase shift of reference signal $i_{ref}$ to achieve a meaningful reduction of distortion of alternating input current signal $i_{in}$. This is because at lower input voltage ($v_{in}$), input current $i_{in}$ is higher for the same power, and the higher input current $i_{in}$, the lower the residual level of voltage $v_c$. Thus, switching device 164 may be controlled (details of controlling are not discussed or illustrated; known methods and apparatuses may be used for this function) to be closed at levels of alternating input voltage signal $v_{in}$ above a specified level to ensure that reference signal $i_{ref}$ is phase-shifted to be delayed with respect to alternating input voltage signal $v_{in}$ and voltage $v_c$, as descried in connection with converter 10b, illustrated in FIG. 4. At levels of alternating input voltage signal $v_{in}$ below a specified value, switching device 164 may be opened, or controlled to operate with high impedance, thereby effectively reducing the phase shift imposed upon reference signal $i_{ref}$.

As mentioned above, resistive element 166 may optionally be included in switchable delay circuit 160. Its value may be chosen to effectively control swings of input-indicating sin $i_{indin}$ phase shift.

Figure 8:
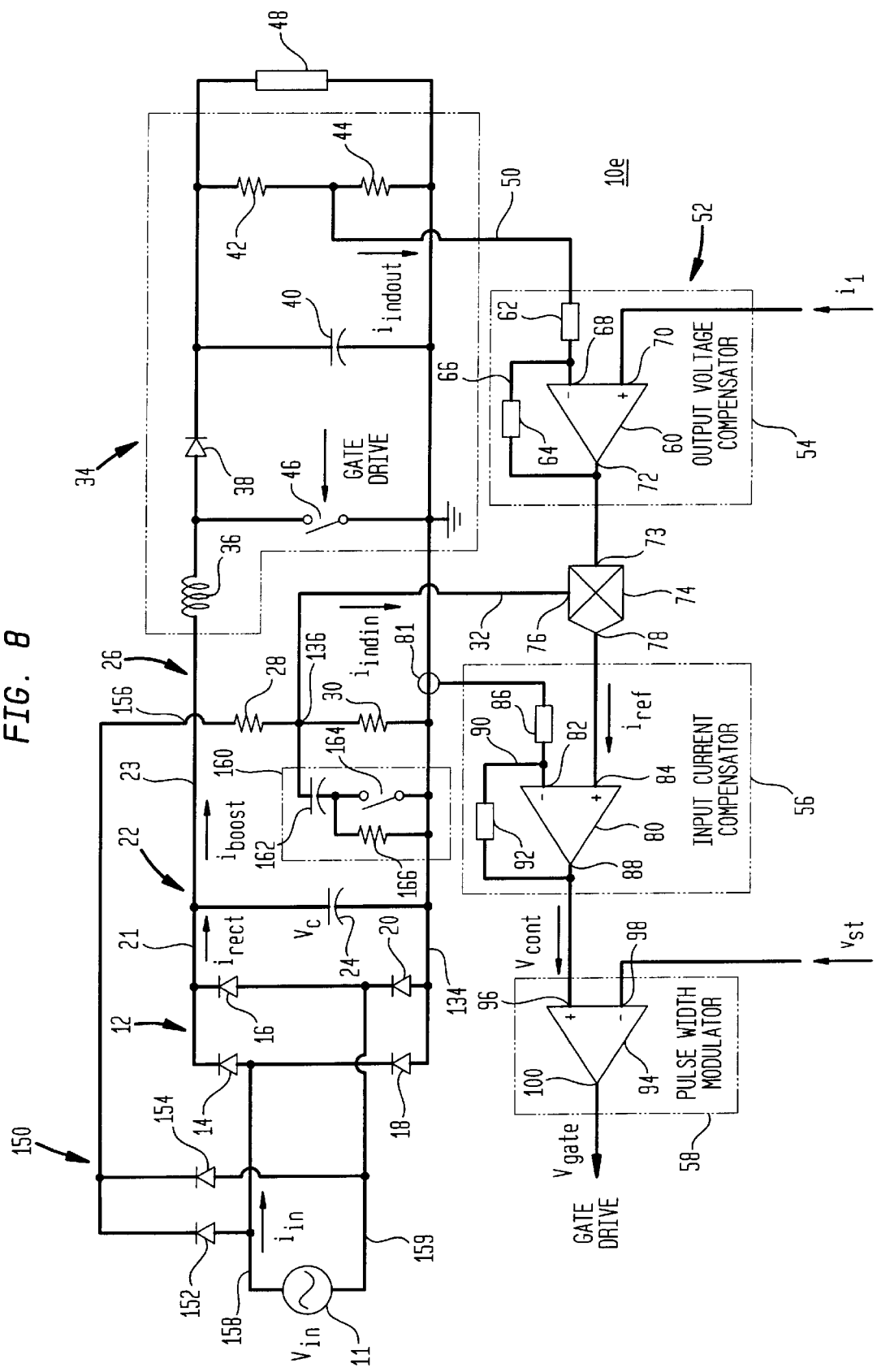
FIG. 8 is an electrical schematic diagram of a fourth embodiment of the power factor correcting switched electrical converter of the present invention.

FIG. 8 is an electrical schematic diagram of a fourth embodiment of the power factor correcting switched electrical converter of the present invention. In FIG. 8, an electrical converter 10e is substantially the same construction in many respects as converter 10c, illustrated in FIG. 6, with a switchable delay circuit 160 added. Therefore, in the interest of avoiding prolixity, a detailed construction of elements of converter 10e which are common with converter 10c will not be recited here.

A significant improvement included in converter 10e of FIG. 8 is switchable delay circuit 160. Switchable delay circuit 160 comprises a capacitor 162 connecting line 134 and a junction 136 intermediate resistors 28, 30 of input voltage sensing circuit 26. Switchable delay circuit 160 further comprises a switching device 164 in series with capacitor 162 intermediate capacitor 162 and line 134. Switchable delay circuit 160 may, if desired, include a resistive element 166 connected in parallel with switching device 164. The construction and operation of switchable delay circuit 160 within converter 10e is substantially the same as the construction and operation of switchable delay circuit 160 described in connection with converter 10d (FIG. 7). Therefore, in the interest of avoiding prolixity, a detailed description of the construction and operation of switchable delay circuit 160 in connection with converter 10e (FIG. 8) will not be recited here.

Figure 9:
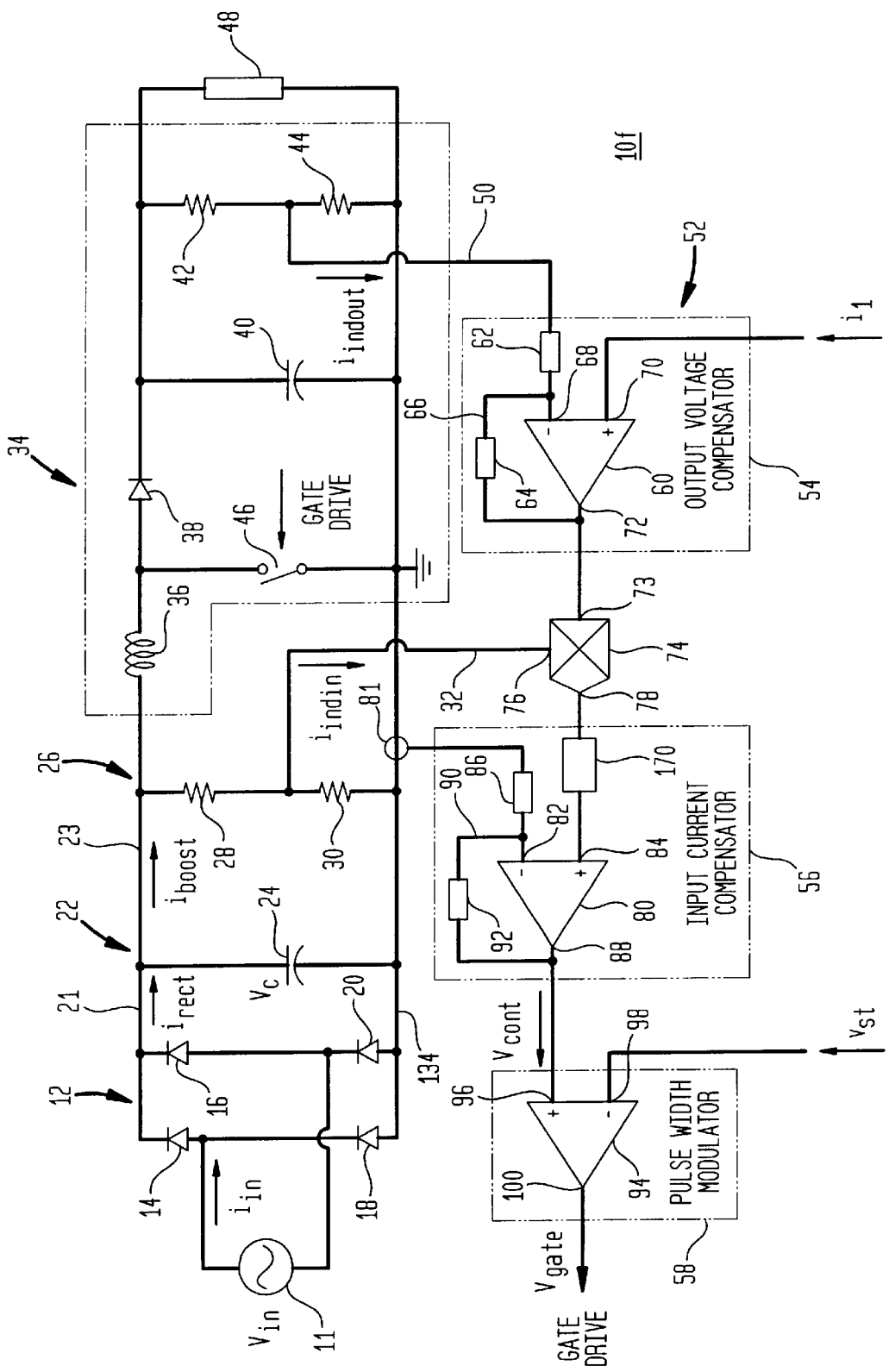
FIG. 9 is an electrical schematic diagram of a fifth embodiment of the power factor correcting switched electrical converter of the present invention.

FIG. 9 is an electrical schematic diagram of a fifth embodiment of the power factor correcting switched electrical converter of the present invention. In FIG. 9, an electrical converter 10f is substantially the same construction in many respects as converter 10, illustrated in FIG. 1, with a delay circuit 170 added in input current compensator circuit 56. Therefore, in the interest of avoiding prolixity, a detailed construction of elements of converter 10f which are common with converter 10 will not be recited here. A significant improvement in electrical converter 10f is the addition of delay circuit 170 intermediate multiplier 74 and noninverting input 84 of operational amplifier 80. Delay circuit 170 imposes a delay upon the output signal received from output 78 of multiplier 74. In such an arrangement, reference signal $i_{ref}$, applied at noninverting input 84 of operational amplifier 80, will be out of phase with respect to input indicating signal $i_{indin}$.

Figure 10A:
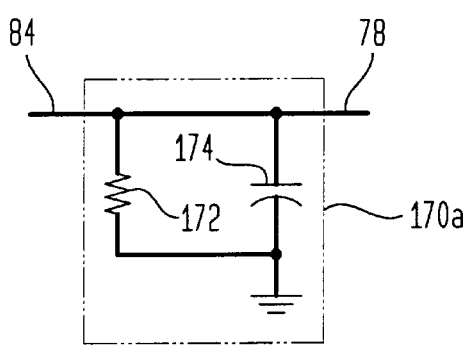
FIGS. 10(a) and (b) are electrical schematic diagrams of representative alternate details of a portion of the electrical converter apparatus illustrated in FIG. 9.

FIGS. 10(a) and (b) are electrical schematic diagram of representative alternate details of a portion of the electrical converter apparatus illustrated in FIG. 9. In FIG. 10(a), delay circuit 170a is connected intermediate output 78 of multiplier 74 and noninverting input 84 of operational amplifier 80. Delay circuit 170a, in the exemplary circuit imputed in FIG. 10(a), includes a resistor 172 connected in parallel with a capacitor 174 between the input line to noninverting input 84 and ground. In such a configuration, resistor 172 and capacitor 174 establish a resistive-capacitive (RC) delay circuit that imposes a delay upon reference signal $i_{ref}$. This configuration is effective when the multiplier has a current-type output.

Figure 10B:
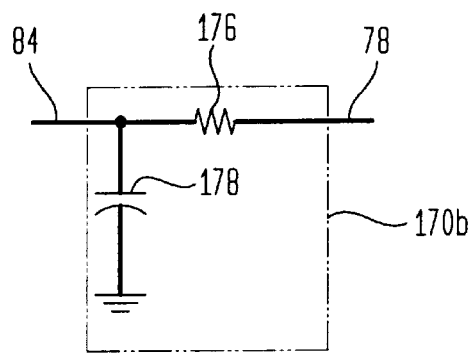

In FIG. 10(b) delay circuit 170b is connected intermediate output 78 of multiplier 74 and noninverting input 84 of operational amplifier 80. Delay circuit 170b, in the exemplary circuit illustrated in FIG. 10(b), includes a resistor 176 connected in series in the input line to noninverting input 84, and a capacitor 178 connected between the input line to noninverting input 84 and ground. In such a configuration, resistor 176 and capacitor 178 establish a resistive-capacitive (RC) delay circuit that imposes a delay upon reference signal $i_{ref}$. This configuration is effective if multiplier 74 has a voltage-type output.

Figure 11:
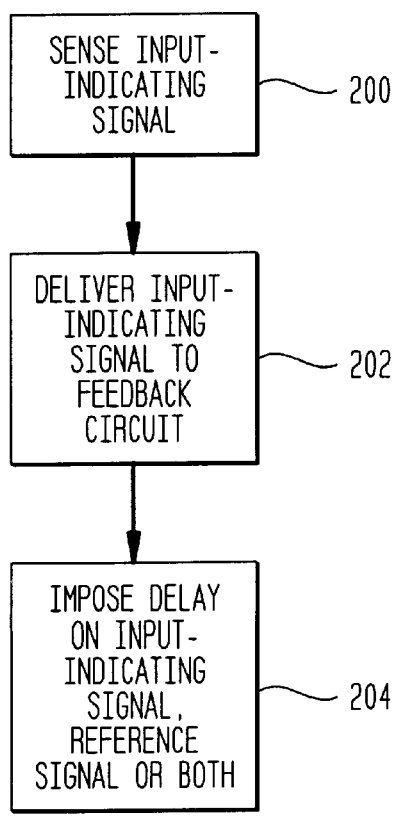
FIG. 11 is a block diagram illustrating the method of the present invention.

FIG. 11 is a block diagram illustrating the method of the present invention. In FIG. 11, a method for reducing input current distortion in a power converting apparatus is shown. The power converting apparatus receives an alternating input signal from a power source, as illustrated in several figures above in connection with various embodiments of the apparatus of the present invention. The apparatus includes a rectifying circuit connected with the power source for receiving the input signal and generating a rectified input signal. An electrical converter device is connected with the rectifying circuit; the electrical converter device provides a switch-controlled regulated output signal to a load. A feedback circuit is connected with the rectifying circuit and with the electrical converter device. The feedback circuit receives an input-indicating signal from the rectifying circuit and receives an output-indicating signal from the electrical converter device. The input-indicating signal is representative of the rectified input signal The feedback circuit employs the input-indicating signal in establishing a reference signal for use in generating a gating signal for controlling the switch in the electrical converter device. The method comprises the steps of: (a) sensing the input-indicating signal as indicated by a block 200; (b) delivering the input-indicating signal to the feedback circuit, as indicated by a block 202; and (c) imposing a delay upon at least one of the indicating signal and the reference signal, the delay causing the reference signal to be out of phase with the rectified input signal, as indicated by a block 204.

The descriptions contained herein refer to the preferred embodiment of the present invention. The descriptions, therefore, are necessarily exemplary in nature. The present invention may be advantageously employed with any type of converter device in a power factor correcting application, including, but not limited to boost, buck, flyback, forward, SEPIC (Single-Ended Primary Inductor Converter) and Cuk converters.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

I claim:

1. A power factor correcting electrical converter apparatus comprising:

a rectifying device, said rectifying device receiving an alternating input signal and generating a rectified input signal;

a filtering device connected with said rectifying device; said filtering device smoothing said rectified input signal;

an input voltage sensing device connected with said filtering device; said input voltage sensing device generating an input-voltage-indicating signal at an input-voltage-indicating node;

an output device connected with said filtering device; said output device delivering power to a load; said output device sensing at least one first electrical parameter associated with said load to produce a first output-indicating signal at a first output-indicating node;

a load parameter-sensing device coupled with said load; said load-parameter sensing device sensing at least one second electrical parameter associated with said load to produce a second output-indicating signal at a second output-indicating node;

a feedback device; said feedback device being connected with said input-voltage-indicating node, with said first output-indicating node and with said second output-indicating node; said feedback device receiving said input-voltage-indicating signal, said first output-indicating signal and said second output-indicating signal; said feedback device employing said first output-indicating signal and said second output-indicating signal to generate a reference signal; said feedback device employing said reference signal and said input-voltage-indicating signal to generate a control signal; said feedback device employing said control signal to generate a gating signal at a gating node;

said output device being connected with said gating node and responding to said gating signal to switchingly control connection between said output device and said load;

said input voltage sensing device being configured to impose a delay, said delay causing said input-voltage-indicating signal to be out of phase with said rectified input signal.

2. A power factor correcting electrical converter apparatus as recited in claim 1 wherein said input voltage sensing device comprises a voltage divider circuit with a capacitive component installed to introduce a resistive-capacitive time delay.

3. A power factor correcting electrical converter apparatus as recited in claim 2 wherein said capacitive component is switchably intermittently included in said input voltage sensing device.

4. A power factor correcting electrical converter apparatus receiving an alternating electrical input signal from a power source; the apparatus comprising:

an input tracking circuit connected with said power source for tracking said input signal and providing said input signal at an input sensing node;

a rectifying circuit connected with said power source for receiving said input signal and generating a rectified input signal;

a filtering circuit connected with said rectifying circuit; said filtering circuit smoothing said rectified input signal;

an input voltage sensing circuit; said input voltage sensing circuit being connected with said input tracking circuit; said input voltage sensing circuit generating an input-voltage-indicating signal at an input-voltage-indicating node;

an output circuit connected with said filtering circuit; said output circuit delivering power to a load; said output circuit sensing at least one first electrical parameter associated with said load to produce a first output-indicating signal at a first output-indicating node;

a load parameter-sensing circuit coupled with said load; said load-parameter sensing circuit sensing at least one second electrical parameter associated with said load to produce a second output-indicating signal at a second output-indicating node;

a feedback circuit connected with said input-voltage-indicating node, with said first output-indicating node and with said second output-indicating node; said feedback circuit receiving said input-voltage-indicating signal said first output-indicating signal and said second output-indicating signal; said feedback circuit employing said input-voltage-indicating signal and said first output-indicating signal to generate a reference signal; said feedback circuit employing said reference signal and said second output-indicating signal to generate a control signal; said feedback circuit employing said control signal to generate a gating signal at a gating node;

said output circuit being connected with said gating node and responding to said gating signal to switchingly control connection between said output device and said load;

said input voltage sensing circuit being configured to impose a delay; said delay causing said input-voltage-indicating signal to be out of phase with said rectified input signal.

5. A power factor correcting electrical converter apparatus receiving an alternating electrical input signal from a power source as recited in claim 4 wherein said input voltage sensing circuit comprises a voltage divider circuit with a capacitive component installed to introduce a resistive-capacitive time delay.

6. A power factor correcting electrical converter apparatus receiving an alternating electrical input signal from a power source as recited in claim 5 wherein said capacitive component is switchably intermittently included in said input voltage sensing circuit.

7. A power factor correcting electrical converter apparatus receiving an alternating electrical input signal from a power source; the apparatus comprising:

a rectifying circuit connected with said power source for receiving said input signal and generating a rectified input signal at an input sensing node;

an electrical converter device connected with said rectifying circuit; said electrical converter device providing a switch-controlled regulated output signal to an output circuit connected with a load; said output circuit generating a first output-indicating signal representing said output signal at a first output-indicating node;

an input voltage sensing circuit; said input voltage sensing circuit being connected with said input sensing node and generating an input-voltage-indicating signal representing said rectified input signal at an input-voltage-indicating node;

a load parameter-sensing circuit coupled with said load; said load-parameter sensing circuit sensing a second electrical parameter associated with said output circuit to produce a second output-indicating signal at a second output-indicating node;

a feedback circuit connected with said input-voltage-indicating node, with said first output-indicating node and with said second output-indicating node; said feedback circuit receiving said input-voltage-indicating signal, said first output-indicating signal and said second output-indicating signal; said feedback circuit employing said input-voltage-indicating signal and said first output-indicating signal to generate a reference signal; said feedback circuit employing said reference signal and said second output-indicating signal to generate a control signal; said feedback circuit employing said control signal to generate a gating signal at a gating node;

said input sensing circuit being configured to impose a delay; said delay causing said input-voltage-indicating signal to be out of phase with said rectified input signal.

8. A power factor correcting electrical converter apparatus receiving an alternating electrical input signal from a power source as recited in claim 7 wherein said electrical converter device is a boost type switching mode power converter.

9. A power factor correcting electrical converter apparatus receiving an alternating electrical input signal from a power source as recited in claim 7 wherein said input voltage sensing circuit comprises a voltage divider circuit with a capacitive component installed to introduce a resistive-capacitive time delay.

10. A power factor correcting electrical converter apparatus receiving an alternating electrical input signal from a power source as recited in claim 9 wherein said capacitive component is switchably intermittently included in said input voltage sensing circuit.

11. A method for reducing input current distortion in a power converting apparatus; said power converting apparatus receiving an alternating input signal from a power source; said apparatus including a rectifying circuit connected with said power source for receiving said input signal and generating a rectified input signal; an electrical converter device connected with said rectifying circuit; said electrical converter device providing a switch-controlled regulated output signal to a load; a feedback circuit connected with said rectifying circuit and with said electrical converter device; said feedback circuit receiving an input-voltage-indicating signal from said rectifying circuit and receiving a first output-indicating signal and a second output-indicating signal from said electrical converter device; said input-voltage-indicating signal being representative of said rectified input signal; said feedback circuit employing said input-voltage-indicating signal in establishing a control signal for use in generating a gating signal for controlling said switch in said electrical converter device; the method comprising the steps of:

(a) sensing said input-voltage-indicating signal;

(b) delivering said input-voltage-indicating signal said first output-indicating signal and said second output-indicating signal to said feedback circuit;

(c) imposing a delay upon said input-voltage-indicating signal to provide a delayed input-voltage-indicating signal; said delayed input-voltage-indicating signal being out of phase with said rectified input signal;

(d) employing said feedback circuit with said delayed input-voltage-indicating signal and one output-indicating signal of said first output-indicating signal and said second output-indicating signal to generate a reference signal; and employing said feedback circuit with said reference signal and the other output-indicating signal of said first output-indicating signal and said second output-indicating signal than said one output-indicating signal to generate said gating signal.

* * * * *